(12) United States Patent
Twardochleb et al.

(10) Patent No.: US 9,086,017 B2
(45) Date of Patent: Jul. 21, 2015

(54) FUEL INJECTOR WITH PURGED INSULATING AIR CAVITY

(75) Inventors: Christopher Zdzislaw Twardochleb, Alpine, CA (US); Jonathan Gerrard Duckers, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 540 days.

(21) Appl. No.: 13/477,819

(22) Filed: May 22, 2012

(65) Prior Publication Data

US 2013/0283809 A1  Oct. 31, 2013

Related U.S. Application Data

(60) Provisional application No. 61/639,013, filed on Apr. 26, 2012.

(51) Int. Cl.
| | |
|---|---|
| *F02C 7/22* | (2006.01) |
| *F02C 3/24* | (2006.01) |
| *F02C 9/40* | (2006.01) |
| *F23K 5/18* | (2006.01) |
| *F23R 3/28* | (2006.01) |
| *F23R 3/36* | (2006.01) |

(52) U.S. Cl.
CPC ... *F02C 3/24* (2013.01); *F02C 9/40* (2013.01); *F23K 5/18* (2013.01); *F23R 3/283* (2013.01); *F23R 3/286* (2013.01); *F23R 3/36* (2013.01); *F23R 2900/00004* (2013.01)

(58) Field of Classification Search
CPC .............. F02C 7/22; F02C 7/222; F02C 3/24; F02C 9/40; F23R 3/283; F23R 3/286; F23R 3/36; F23R 3/14
USPC ........... 60/734, 737, 738, 739, 740, 746, 748, 60/39.463
See application file for complete search history.

(56) References Cited

U.S. PATENT DOCUMENTS

| | | | |
|---|---|---|---|
| 4,311,277 A * | 1/1982 | Stratton | |
| 5,404,711 A * | 4/1995 | Rajput | |
| 5,467,926 A | 11/1995 | Idleman et al. | |
| 5,826,429 A * | 10/1998 | Beebe et al. | |
| 5,836,163 A | 11/1998 | Lockyer et al. | |
| 2007/0074517 A1 | 4/2007 | Chipman Rogers et al. | |
| 2010/0071666 A1 * | 3/2010 | Lee et al. | |
| 2010/0154424 A1 | 6/2010 | Twardochleb et al. | |
| 2010/0251720 A1 | 10/2010 | Pelletier et al. | |
| 2010/0307161 A1 * | 12/2010 | Thomson et al. | |

* cited by examiner

*Primary Examiner* — Phutthiwat Wongwian
*Assistant Examiner* — Steven Sutherland
(74) *Attorney, Agent, or Firm* — Finnegan, Henderson, Farabow, Garrett & Dunner, LLP

(57) ABSTRACT

A fuel injector includes a flow path for fuel air mixture to a combustor extending longitudinally through the fuel injector. The fuel injector may also include a liquid fuel gallery at least partially encircling the flow path. The gallery may include a plurality of fuel spokes configured to deliver liquid fuel from the gallery to the flow path. The fuel injector may also include an annular outer housing circumferentially positioned about the gallery to form an insulating air cavity at least partially around the gallery. The outer housing may include at least one purge hole to provide communication between the insulating air cavity and outside the outer housing of the injector.

20 Claims, 5 Drawing Sheets

FUEL INJECTOR WITH PURGED INSULATING AIR CAVITY

RELATED APPLICATIONS

This application is based on and claims the benefit of priority from U.S. Provisional Application No. 61/639,013 by Twardochleb et al., filed Apr. 26, 2012, the contents of which are expressly incorporated herein by reference.

TECHNICAL FIELD

The present disclosure relates generally to a fuel injector for a gas turbine engine, and more particularly, to a gas turbine fuel injector with a purged insulating air cavity.

BACKGROUND

Gas turbine engines produce power by extracting energy from a flow of hot gas produced by combustion of fuel in a stream of compressed air. In general, turbine engines have an upstream air compressor coupled to a downstream turbine with a combustion chamber ("combustor") in between. Energy is released when a mixture of compressed air and fuel is burned in the combustor. The resulting hot gases are directed over blades of the turbine to spin the turbine and produce mechanical power. In a typical turbine engine, one or more fuel injectors direct some type of liquid or gaseous hydrocarbon fuel (such, diesel fuel or natural gas) into the combustor for combustion. This fuel mixes with compressed air (from the air compressor) in the fuel injector, and flow to the combustor for combustion. Combustion of the fuel in the combustor can create temperatures exceeding 2000° F. (1093.3° C.). These high temperatures in the vicinity of the fuel injector increase the temperature of the fuel injector during operation of the turbine engine.

In fuel injectors, fuel lines and fuel galleries are used to direct the fuel to the combustor. The high temperatures of the fuel injector during operation may lead to coking of liquid fuel in these lines and galleries. Over time, this coke deposit in the lines and galleries can lead to flow restrictions that adversely affect the operation of the gas turbine engine. In some fuel injectors, insulating cavities or shrouds may be disposed around fuel lines or galleries that are susceptible to coking.

SUMMARY

In one aspect, a fuel injector for a dual fuel gas turbine engine is disclosed. The fuel injector includes a flow path for fuel air mixture to a combustor extending longitudinally through the fuel injector. The fuel injector may also include a liquid fuel gallery at least partially encircling the flow path. The gallery may include a plurality of fuel spokes configured to deliver liquid fuel from the gallery to the flow path. The fuel injector may also include an annular outer housing circumferentially positioned about the gallery to form an insulating air cavity at least partially around the gallery. The outer housing may include at least one purge hole to provide communication between the insulating air cavity and outside the outer housing of the injector.

In another aspect, a method of operating a dual fuel gas turbine engine is disclosed. The gas turbine engine may include a liquid fuel gallery configured to include liquid fuel when the gas turbine engine operates on liquid fuel. The liquid fuel gallery may be fluidly coupled to a fuel flow passage of the fuel injector through a fuel spoke. The liquid fuel gallery may be positioned within an annular housing circumferentially extending about the liquid fuel gallery to form an insulating air cavity extending at least partially around the liquid fuel gallery. The housing may include a plurality of purge holes that fluidly couple the insulating air cavity to a compressed air space surrounding the housing. The method may include mixing gaseous fuel with compressed air in the fuel flow passage to form a fuel air mixture, and directing the fuel air mixture to a combustor of the gas turbine engine past the fuel spoke. The method may also include directing compressed air from the compressed air space into the insulating air cavity solely through the plurality of purge holes, and directing the compressed air from the insulating air cavity to the fuel flow passage to mix with the fuel air mixture flowing therethrough.

In yet another aspect, a dual fuel gas turbine engine is disclosed. The gas turbine engine includes a compressor, a combustor positioned downstream of the compressor, and a fuel injector fluidly coupling the compressor and the combustor. The fuel injector may be configured to direct a fuel air mixture to the combustor through a flow path that extends longitudinally though the fuel injector. The fuel injector may include a gallery for liquid fuel at least partially encircling the flow path, and a plurality of fuel spokes fluidly coupling the gallery to the flow path. The fuel injector may also include an annular housing circumferentially extending about the gallery to form an insulating air cavity around the gallery. The housing may be configured to separate the insulating air cavity from a compressed air space surrounding the housing. The housing may include a plurality of purge holes configured to direct compressed air from the compressed air space into the air cavity. A diameter of each purge hole of the plurality of purge holes may be less than or equal to about 0.075 inches.

DETAILED DESCRIPTION

Figure 1:
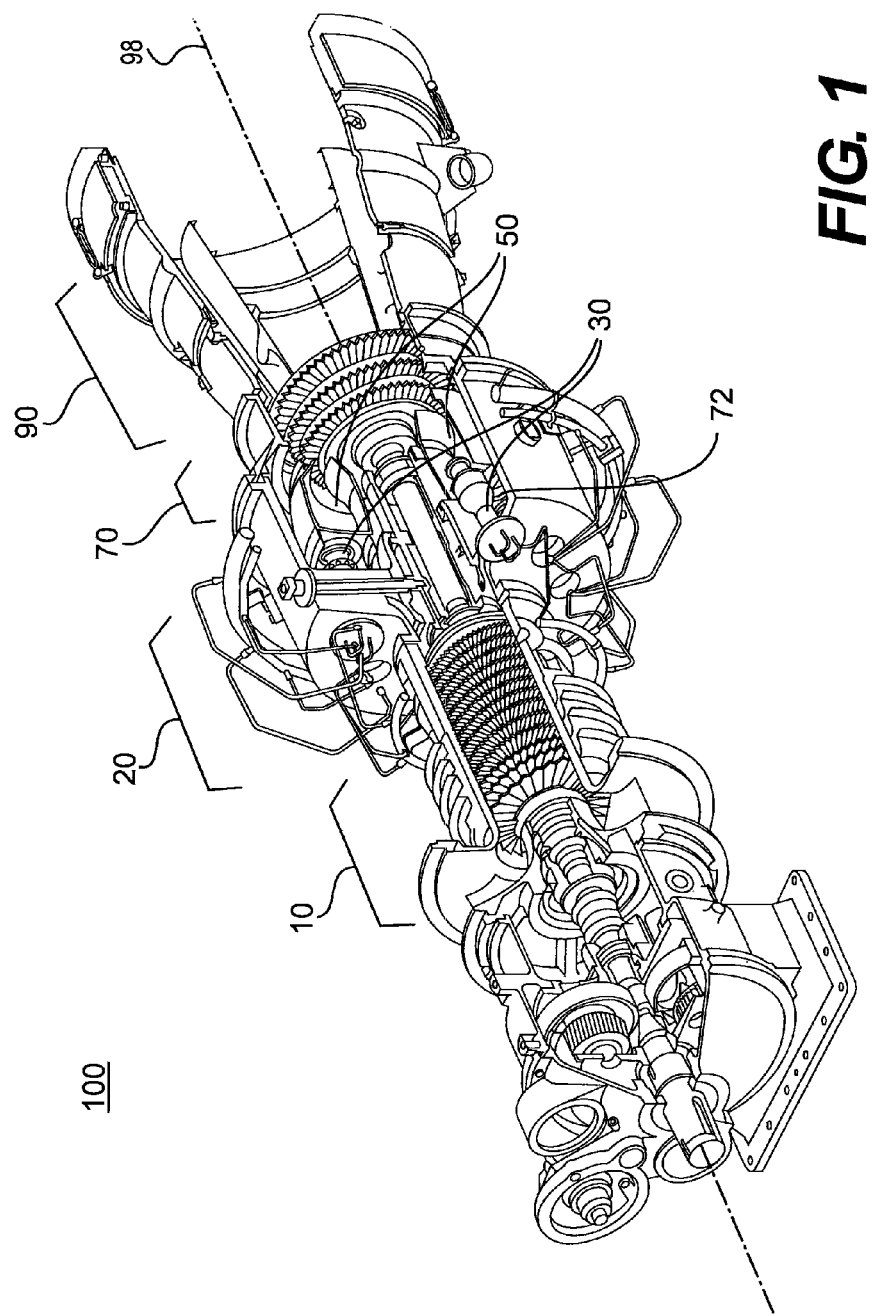
FIG. 1 is an illustration of an exemplary disclosed gas turbine engine system.

FIG. 1 illustrates an exemplary gas turbine engine (GTE) 100. GTE 100 may have, among other systems, a compressor system 10, a combustor system 20, a turbine system 70, and an exhaust system 90 arranged along an engine axis 98. Compressor system 10 compresses air to a compressor discharge pressure and temperature (approximately 200 psi and 800° F. (426.7° C.) respectively) and delivers the compressed air to an enclosure 72 of combustor system 20. The compressed air is then directed from enclosure 72 into one or more fuel injectors 30 positioned therein. The compressed air may be mixed with a fuel in fuel injector 30, and the mixture is directed to a combustor 50. The fuel air mixture ignites and burns in combustor 50 to produce combustion gases at high pressures and temperatures. These combustion gases are then directed to turbine system 70. Turbine system 70 extracts energy from these combustion gases, and directs the exhaust gases to the atmosphere through exhaust system 90. The layout of GTE 100 illustrated in FIG. 1, and described above, is only exemplary and fuel injectors 30 of the current disclosure may be used with any configuration and layout of GTE 100.

Figure 2:
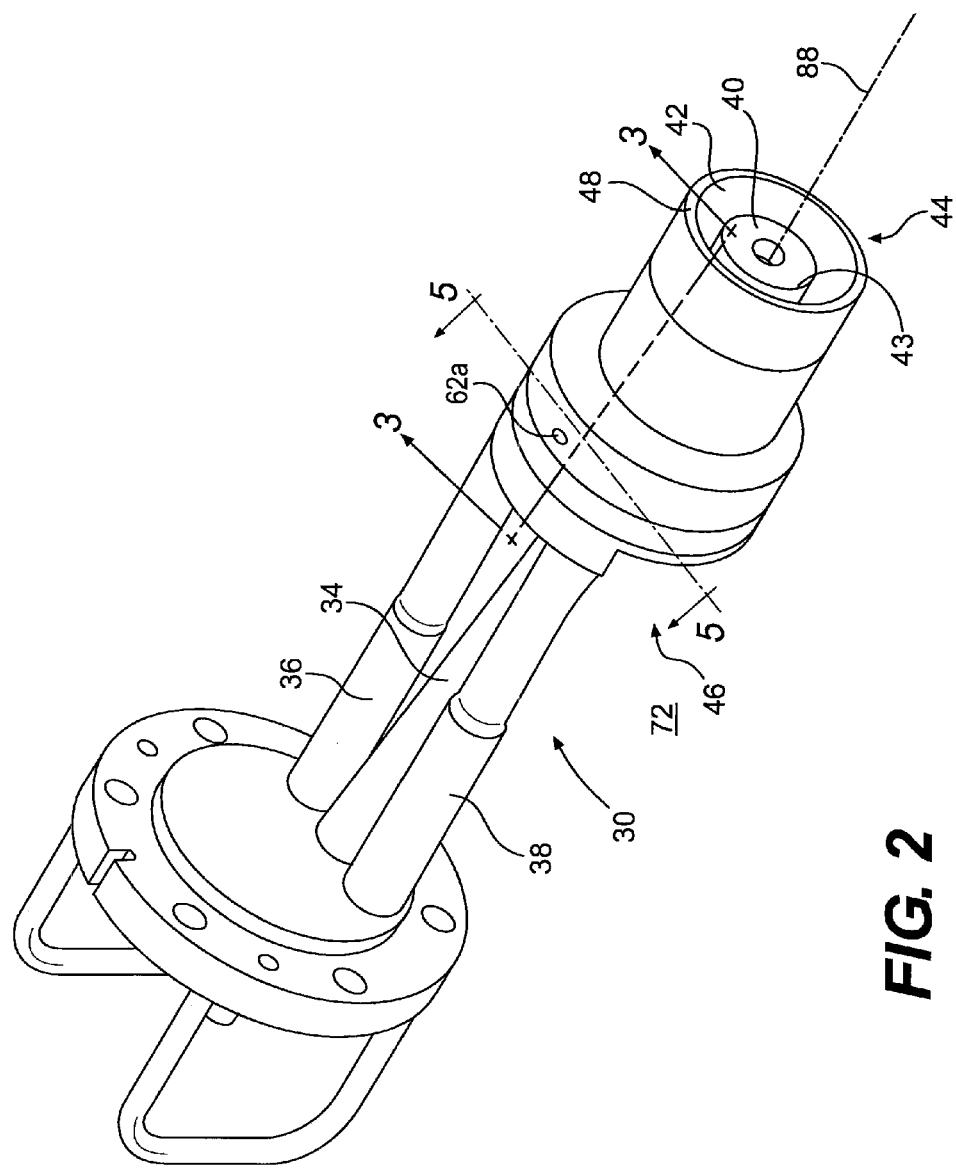
FIG. 2 is an illustration of an exemplary fuel injector used in the turbine engine of FIG. 1.

FIG. 2 is an illustration of an embodiment of a fuel injector 30 that may be coupled to combustor 50 of GTE 100. Fuel injector 30 extends from a first end 44, that is fluidly coupled to combustor 50, to a second end 46 that is positioned in enclosure 72. Compressed air, that is stored in enclosure 72, enters fuel injector 30 through openings (not visible in FIG. 2) on second end 46. Liquid fuel is also directed into fuel injector 30 at the second end 46 through a liquid fuel line 38 (and pilot fuel supply line 34). This fuel gets mixed with compressed air flowing through fuel injector 30 and the fuel air mixture enters combustor 50 through first end 44. Some embodiments of fuel injector 30 (such as the embodiment of fuel injector 30 illustrated in FIG. 2) may be a dual fuel injector that is configured to selectively deliver a gaseous fuel and a liquid fuel to combustor 50. In dual fuel injectors, the fuel delivered to fuel injector 30 may be switched between a gaseous and a liquid fuel to suit the operating conditions of GTE 100. For instance, at an operating site with an abundant supply of natural gas, fuel injector 30 may deliver liquid fuel to combustor 50 during start up and later switch to natural gas fuel to utilize the locally available fuel supply. In a dual fuel injector, in addition to the fuel lines that deliver liquid fuel, fuel lines may also deliver gaseous fuel to the fuel injector. For instance, in fuel injector 30 of FIG. 2, gas fuel line 36 (and pilot fuel supply line 34) may direct gaseous fuel to fuel injector 30.

To reduce the emission of atmospheric pollutants (such as $NO_x$) while maintaining a stable flame in combustor 50, fuel injector 30 directs a rich fuel air mixture to combustor 50 through a centrally located pilot assembly 40. The pilot fuel supply line 34 supplies liquid and/or gaseous fuel to the pilot assembly 40. Fuel injector 30 also includes a tubular premix barrel 48 circumferentially disposed about a housing 43 of pilot assembly 40 to define an annular duct 42 around pilot assembly 40. A lean premixed fuel air mixture is directed to combustor 50 through this annular duct 42. The liquid fuel (and gaseous fuel in the case of dual fuel injectors) and compressed air are directed to both pilot assembly 40 and annular duct 42 to form the pilot fuel air mixture and the premixed fuel air mixture, respectively. These fuel air mixtures (pilot and premixed fuel air mixtures) form separate fuel air streams that are directed into combustor 50 through first end 44 of fuel injector 30.

Figures 3, 4:
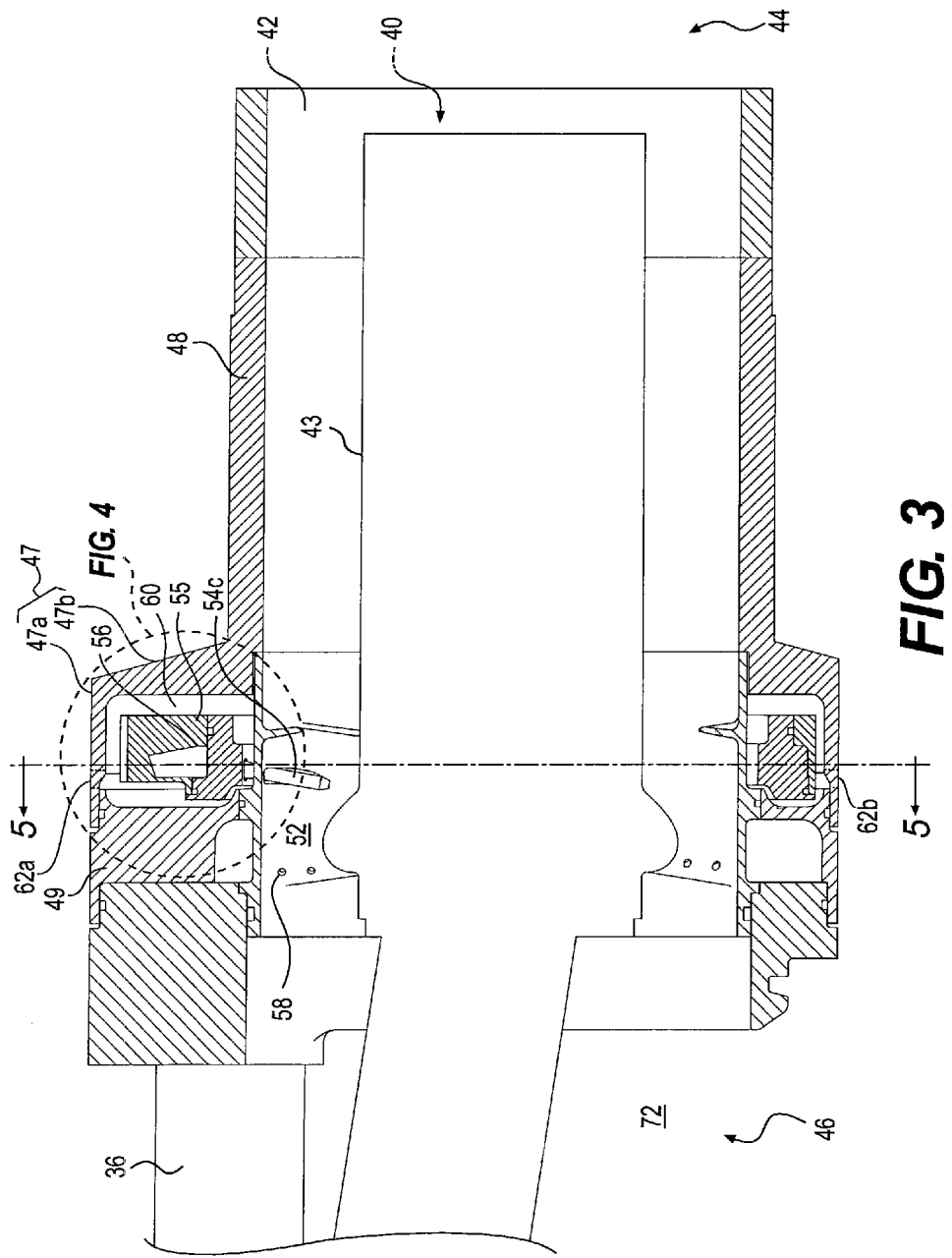
FIG. 3 is a cross-sectional view of the fuel injector of FIG. 2 along a longitudinal plane.
FIG. 4 is a perspective view of a portion of the fuel gallery of the fuel injector of FIG. 2.
Figure 4:
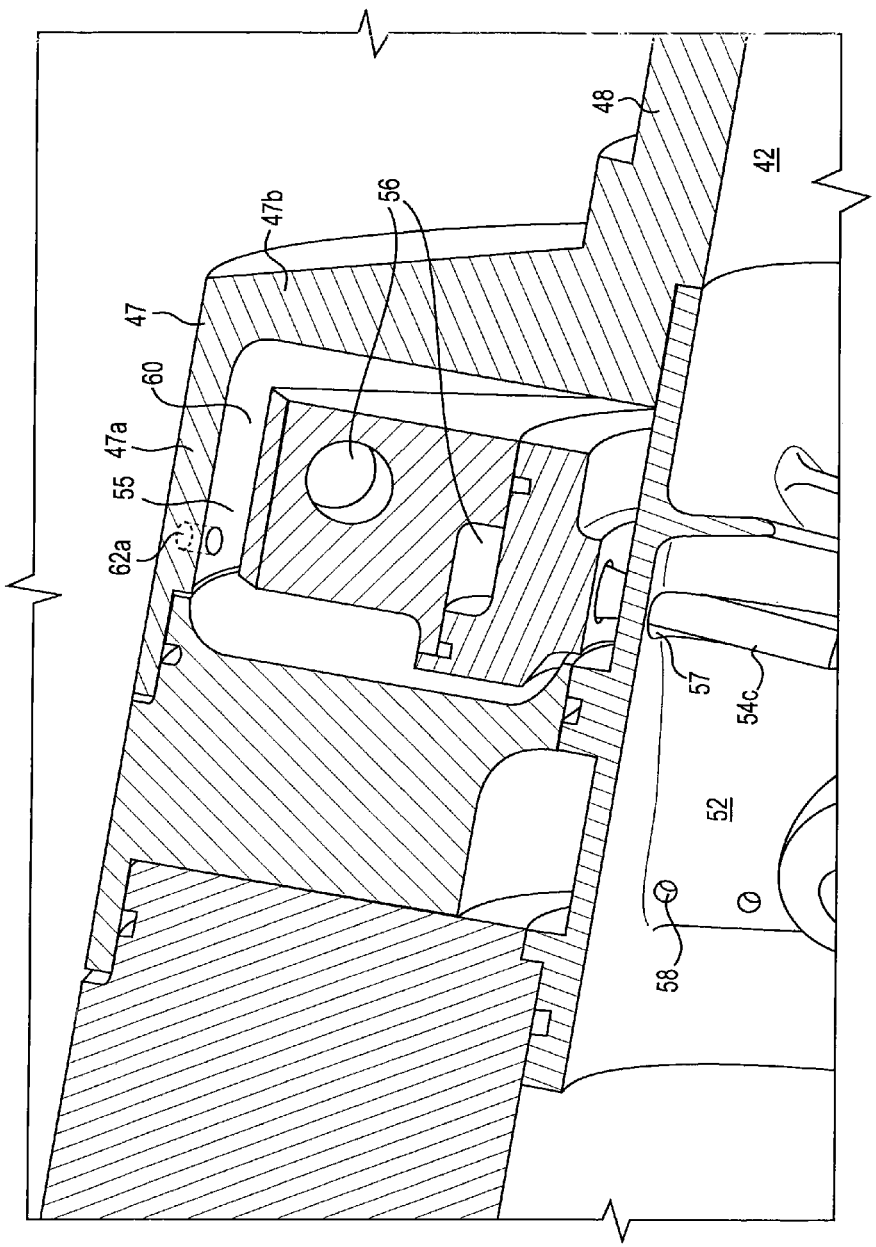
Figure 5:
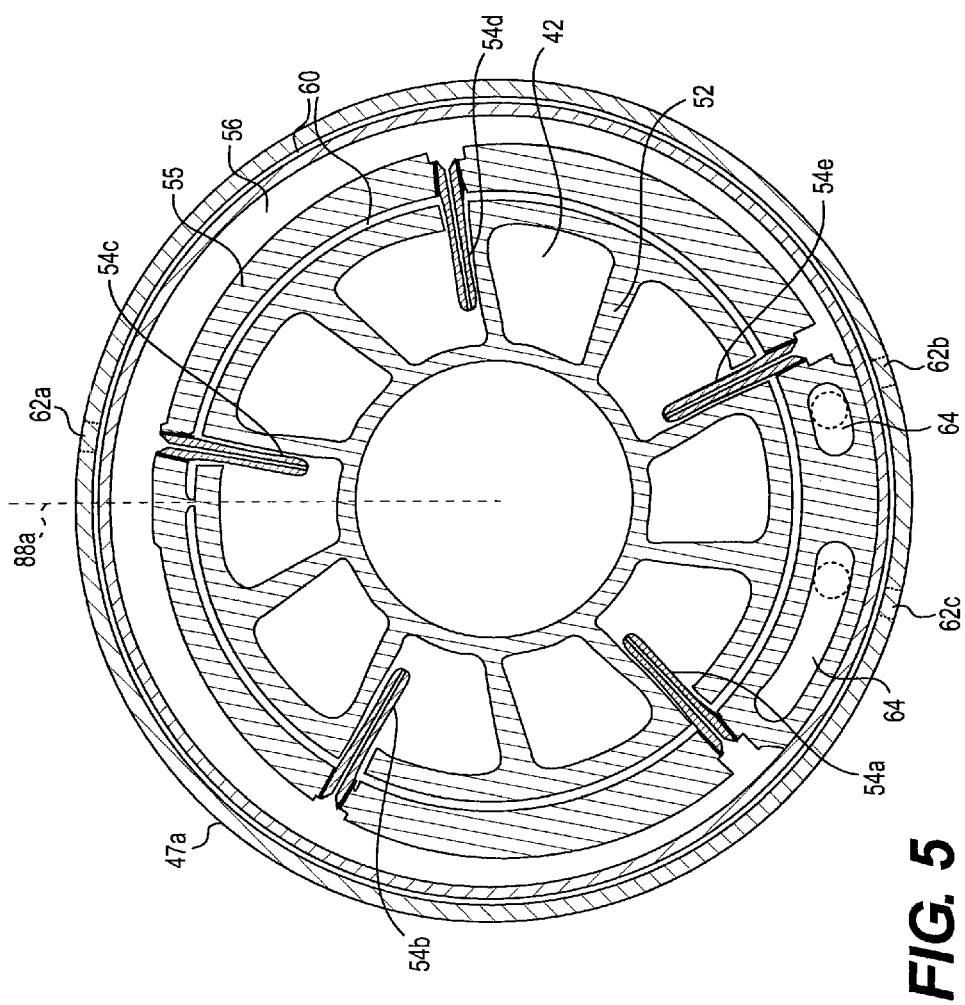
FIG. 5 is a cross-sectional view of the fuel injector of FIG. 2 along a transverse plane.

FIG. 3 is a cross-sectional illustration of fuel injector 30 along plane 3-3 of FIG. 2. Pilot assembly 40 includes multiple components that cooperate together to deliver the pilot fuel air mixture to combustor 50. Since the operation of fuel injectors and pilot assemblies are known in the art, details of the pilot assembly 40 are omitted for the sake of brevity. Proximate second end 46, annular duct 42 includes an air swirler 52 that is configured to impart a swirl to the compressed air entering annular duct 42 from enclosure 72. Fuel from liquid fuel line 38 (see FIG. 2) is directed to a liquid fuel manifold (manifold 55) annularly disposed about the air swirler 52. The manifold 55 includes a liquid fuel gallery (fuel gallery 56) containing liquid fuel circumferentially disposed around the manifold 55. A plurality of spokes 54a-54e (see also FIG. 5) deliver the liquid fuel from fuel gallery 56 to the compressed air flowing past air swirler 52. This fuel mixes with the swirled air stream to form the premixed fuel air mixture that enters combustor 50 through annular duct 42. Although FIGS. 3-5 illustrate the spokes 54a-54e as being coupled to air swirler 52, this is not a requirement, and in some embodiments, the spokes 54a-54e may be positioned upstream or downstream of air swirler 52. In dual fuel injectors, air swirler 52 also includes a plurality of orifices 58 configured to inject gaseous fuel into the swirled air stream. Depending upon the type of fuel the fuel injector is operating on, one of liquid fuel or gaseous fuel is delivered to the compressed air flowing past air swirler 52. This fuel (liquid or gaseous) will mix with the compressed air to form the main fuel stream.

FIG. 4 is a perspective view of a region of fuel injector 30 around the fuel gallery 56 (identified in FIG. 3). FIG. 5 is a cross-sectional schematic view of the fuel injector 30 along plane 5-5 of FIG. 2. In the description below, reference will be made to FIGS. 3-5. Liquid fuel from liquid fuel line 38 is directed into the fuel gallery 56 at an inlet (not shown). The fuel gallery 56 wraps around the manifold 55 to extend from the inlet to a tip that, in some embodiments, may extend past and overlap the inlet. In some embodiments (as seen in FIG. 5), however, the fuel gallery 56 may only extend partially around the circumference of the manifold 55. Spokes 54a-54e fluidly couple the fuel gallery 56 to annular duct 42. Although five spokes (54a-54e) are illustrated in the embodiment of FIG. 5, in general, any number of spokes may be arranged in any manner (symmetrically or otherwise) in different embodiments of fuel injectors. These spokes 54a-54e extend into annular space 42 through the vanes of air swirler 52 and spray liquid fuel from fuel gallery 56 into the compressed air flowing past the air swirler 52.

The manifold 55 is positioned in fuel injector 30 proximate the enclosure 72 containing compressed air at a high temperature and pressure. To help prevent coking of the liquid fuel in fuel gallery 56, an insulating air cavity (cavity 60) is formed at least partially around the circumference of the manifold 55. As illustrated in FIGS. 3 and 4, the cavity 60 may also extend at least partially around a cross-section of the manifold 55. The cavity 60 shields the fuel gallery 56 from the high temperature air in enclosure 72, and helps to maintain the fuel gallery 56 at a temperature below the coking temperature of the liquid fuel. The cavity 60 is formed by enclosing the manifold 55 using a channel section 47 at the upstream end of the premix barrel 48. The channel section 47 may be an inverted L-shaped region, having a horizontal wall 47a connected to a vertical wall 47b, at the upstream end of the premix barrel 48. One end of the horizontal wall 47a may be attached (brazed, etc.) to a housing 49 and the opposite end of the vertical wall 47b may be attached to the air swirler 52 to separate the manifold 55 from enclosure 72, and form the cavity 60 around the manifold 55. The spokes 54a-54e that direct liquid fuel from fuel gallery 56 to the annular space 42 extend into the vanes of the air swirler 52 through the cavity 60. A clearance 57 (see FIG. 5) formed between the spokes 54a-54e and the swirler vanes fluidly couple the cavity 60 to the annular space 42.

During operation of GTE 100 with liquid fuel, liquid fuel is discharged into annular space 42 through spokes 54a-54e. The liquid fuel mixes with the compressed air in annular space 42 and flows downstream towards the combustor 50. When GTE 100 operates on gaseous fuel, liquid fuel supply to the fuel gallery 56 is turned off, and gaseous fuel is discharged into the annular space 42 through orifices 58. The gaseous fuel mixes with the compressed air in the annular space 42 and flows past spokes 54a-54e to the combustor 50. As the fuel air mixture flows past the spokes 54a-54e, a portion of the fuel air mixture tends to migrate into the fuel gallery 56 and the cavity 60 through the outlet of the spokes 54a-54e and clearance 57. This ingress of fuel into the inactive fuel lines and cavities of a fuel injector is called cross-migration.

In some applications, cross-migration causes the migrated fuel air mixture to ignite within the fuel gallery 56 and/or the cavity 60. This phenomenon, called auto-ignition, is especially common with fuels having a low auto-ignition delay time. Auto-ignition delay time is a measure of the time it takes for a fuel air mixture at a certain temperature to ignite. Fuels that include heavy hydrocarbons (such as, for example, butane, propane, etc.) are known to have low auto-ignition delay time. In addition to potential hardware damage, auto-ignition causes coking of fuel in fuel passages.

Circumferential pressure variations of the fuel air mixture in the annular space 42 exacerbates the ingress of gaseous fuel into the fuel gallery 56 and the cavity 60. These circumferential pressure variations may occur in a fuel injector due to several factors. For example, in some fuel injectors, structures (such as, for example, struts, etc.) in the annular space 42 upstream of air swirler 52 cause perturbations in the pressure downstream of the structure. In some fuel injectors, combustion induced pressure fluctuations in the combustor 50 interact with the fuel flow and induce circumferential pressure variations in the annular space 42. Whatever the cause of the pressure fluctuations, spokes 54a-54e that are in regions of high pressure can experience inflow of the fuel air mixture into fuel gallery 56 and/or cavity 60 through these spokes. And, spokes 54a-54e that are in regions of low pressure experience outflow of the fuel air mixture through these spokes. For example, if circumferential pressure variations in the annular space 42 cause the pressure of the mixture proximate spoke 54c to be high and proximate spoke 54e to be low, the fuel air mixture will migrate into the fuel gallery 56 (and the insulated air cavity 60) through spoke 54c (and the clearance 57 associated with spoke 54c), and flow back into the annular space 42 through spoke 54e (and its clearance 57).

In order to prevent or minimize cross-migration of the fuel air mixture into fuel gallery 56, compressed air from compressor system 10 (or another compressor) may be cooled in a heat exchanger and directed into fuel gallery 56 when GTE 100 operates on gaseous fuel. This cooled compressed air being at a higher pressure than the fuel air mixture in annular space 42 prevents ingress of the mixture into the fuel gallery 56. The high pressure compressed air in the fuel gallery 56 flows out into the annular space 42 through spokes 54a-54e, and become part of the premixed fuel air mixture directed to combustor 50.

In order to prevent or minimize ingress of the fuel air mixture into cavity 60, compressed air from enclosure 72 is directed into cavity 60 through purge holes 62a, 62b, 62c formed on the channel section 47. These purge holes 62a, 62b, 62c direct high pressure high temperature compressed air from enclosure 72 into cavity 60 thereby preventing the ingress of lower pressure fuel air mixture into the cavity 60. The compressed air from the cavity 60 flows into the annular space 42 through the clearance 57 and mixes with the fuel air mixture flowing therethrough. The number, size, and location of the purge holes 62a, 62b, 62c may depend on the application. In order to prevent coking, it is desirable to maintain the walls of the fuel gallery significantly below about 800° F. (426.7° C.). Since the compressed air in enclosure 72 is at a high temperature (typically above about 800° F.), increasing the size and number of purge holes may increase the temperature of the fuel gallery 56 and increase the likelihood of coking. While a smaller number and size of purge holes may minimize temperature increase, a smaller number and size of the purge holes may not provide sufficient resistance to cross-migration. To minimize the size and number of purge holes while achieving a desired minimum level of cross-migration, the purge holes may be provided at locations where they provide the most benefit. While, in general, the number, size, and location of the purge holes in an application may depend upon the specific fuel injector design and operating conditions of GTE 100, two purge hole designs that provided substantial reduction in cross-migration and auto-ignition during evaluation, without increasing the fuel gallery 56 temperature above coking temperature, are described below.

In one embodiment (see FIG. 5) three purge holes 62a, 62b, 62c, each less than or equal to about 0.075 inches (about 1.9 mm) in diameter, provided on the horizontal wall 47a of the channel section 47 provided sufficient cross-migration reduction while maintaining the temperature of the fuel gallery 56 below coking temperature. To achieve reduction in cross-migration with only three purge holes 62a, 62b, 62c of less than or equal to 0.075 inches diameter, purge hole 62a was positioned proximate spoke 54c that exhibited a high amount of inflow, and purge holes 62b and 62c were positioned proximate structural features of the manifold 55 that were known to increase auto-ignition. Flow restrictions, such as notches 64 (fluidly coupled to cavity 60), in the manifold 55 are known to obstruct flow of the fuel air mixture in the cavity 60 and increase auto-ignition. Providing purge holes 62b and 62 proximate these notches 64 demonstrated a significant reduction in auto-ignition and cross-migration. In the embodiment illustrated in FIG. 5, purge holes 62a, 62b, and 62c are approximately positioned between 10°-20°, 160°-170°, and 190°-200° from vertical axis 88a.

In another embodiment of fuel injector 30, a purge hole 56a having a diameter of about 0.075 inches provided on the horizontal wall 47a of the channel section 47, and holes purge holes 56b and 56c having a diameter of about 0.03 inches provided on the vertical wall 47b of the channel section 47 (shown in phantom in FIG. 5), provided significant cross-migration reduction without increasing the fuel gallery 56 temperature above coking temperature. The angular position of the three purge holes 56a, 56b, 56c from the vertical axis 88a is the same as that in FIG. 5.

INDUSTRIAL APPLICABILITY

The disclosed gas turbine fuel injector may be applicable to any turbine engine where it is desired to maintain a temperature of the liquid fuel gallery of the fuel injector below coking temperature of the fuel. To insulate the fuel gallery, an insulating air cavity is provided around the gallery. To prevent ingress of fuel and auto-ignition in the air cavity, purge holes are provided to purge the air cavity with high pressure air. The operation of a gas turbine engine with a fuel injector having a purged insulating air cavity will now be described.

When GTE 100 operated on gaseous fuel, liquid fuel supply to the fuel gallery 56 of the fuel injector 30 is turned off, and gaseous fuel is discharged into the fuel injector 30 to mix with air and form a fuel air mixture. To prevent cross-migration of the gaseous fuel air mixture into the inactive fuel gallery 56, cooled compressed air is directed into the fuel gallery 56. To prevent ingress of the gaseous fuel air mixture into the insulating air cavity 60 around the fuel gallery 56, hot compressed air is directed into the cavity 60 through purge holes 62a, 62b, 62c. To minimize the increase in temperature of the fuel gallery 56 due to the hot compressor air, the size and number of the purge holes are reduced. To achieve the desired level of cross-migration reduction with these purge holes 62a, 62b, 62c, the purge holes are provided at locations where maximum benefit is realized.

It will be apparent to those skilled in the art that various modifications and variations can be made to the disclosed gas turbine fuel injector with purged insulating air cavity. Other embodiments will be apparent to those skilled in the art from consideration of the specification and practice of the disclosed gas turbine fuel injector with purged insulating air cavity. It is intended that the specification and examples be considered as exemplary only, with a true scope being indicated by the following claims and their equivalents.

What is claimed is:

1. A fuel injector for a dual fuel gas turbine engine comprising:
    a flow path for fuel air mixture to a combustor extending longitudinally through the fuel injector;
    a liquid fuel gallery at least partially encircling the flow path, the gallery including a plurality of fuel spokes configured to deliver liquid fuel from the gallery to the flow path; and
    an annular outer housing of the fuel injector circumferentially positioned about the gallery to form an insulating air cavity at least partially around the gallery, the outer housing including at least one purge hole to provide communication between the insulating air cavity and outside the outer housing of the injector.

2. The fuel injector of claim 1, wherein the at least one purge hole includes a plurality of purge holes.

3. The fuel injector of claim 2, wherein at least one of the plurality of purge holes is positioned proximate a fuel spoke of the plurality of fuel spokes.

4. The fuel injector of claim 2, wherein a diameter of each purge hole of the plurality of purge holes is less than or equal to about 0.075 inches.

5. The fuel injector of claim 2, wherein a diameter of at least one purge hole of the plurality of purge holes is about 0.03 inches.

6. The fuel injector of claim 2, wherein at least one purge hole of the plurality of purge holes is positioned radially outwardly from the fuel gallery.

7. The fuel injector of claim 2, wherein at least one purge hole of the plurality of purge holes is longitudinally spaced apart from the fuel gallery.

8. The fuel injector of claim 2, wherein the plurality of purge holes are the sole means of air communication between the insulating air cavity and outside the outer housing of the injector.

9. The fuel injector of claim 1, wherein the plurality of fuel spokes are symmetrically positioned about the fuel gallery, and each fuel spoke of the plurality of fuel spokes fluidly couple the fuel gallery to the flow path.

10. The fuel injector of claim 9, wherein the flow path is fluidly coupled to the insulating air cavity through a clearance space formed around each fuel spoke of the plurality of fuel spokes.

11. The fuel injector of claim 10, further including an air swirler positioned in the flow path radially inwardly of the fuel gallery, wherein each fuel spoke of the plurality of fuel spokes extends into the flow path through the air swirler.

12. A method of operating a dual fuel gas turbine engine, the gas turbine engine including a liquid fuel gallery configured to include liquid fuel when the gas turbine engine operates on liquid fuel, the fuel gallery being fluidly coupled to a fuel flow passage of the fuel injector through a fuel spoke, the fuel gallery being positioned within an annular housing circumferentially extending about the gallery to form an insulating air cavity extending at least partially around the gallery, the housing including a plurality of purge holes that fluidly couple the insulating air cavity to a compressed air space surrounding the housing, comprising:
    mixing gaseous fuel with compressed air in the fuel flow passage to form a fuel air mixture;
    directing the fuel air mixture to a combustor of the gas turbine engine past the fuel spoke;
    directing compressed air from the compressed air space into the insulating air cavity solely through the plurality of purge holes; and
    directing the compressed air from the insulating air cavity to the fuel flow passage to mix with the fuel air mixture flowing therethrough.

13. The method of claim 12, further including directing cooled compressed air into the fuel gallery.

14. The method of claim 13, further including directing the cooled compressed air from the fuel gallery to the fuel flow passage to mix with the fuel air mixture flowing therethrough.

15. The method of claim 12, wherein the plurality of purge holes includes three purge holes, and a diameter of the plurality of purge holes is less than or equal to about 0.075 inches.

16. A dual fuel gas turbine engine, comprising:
    a compressor;
    a combustor positioned downstream of the compressor; and
    a fuel injector fluidly coupling the compressor and the combustor, the fuel injector being configured to direct a fuel air mixture to the combustor through a flow path that extends longitudinally though the fuel injector, the fuel injector including:
        a gallery for liquid fuel at least partially encircling the flow path;
        a plurality of fuel spokes fluidly coupling the gallery to the flow path; and
        an annular housing circumferentially extending about the gallery to form an insulating air cavity around the gallery, the housing being configured to separate the insulating air cavity from a compressed air space surrounding the housing, the housing including a plurality of purge holes configured to direct compressed air from the compressed air space into the air cavity, wherein a diameter of each purge hole of the plurality of purge holes is less than or equal to about 0.075 inches.

17. The gas turbine engine of claim 16, further including an air swirler positioned in the flow path, the plurality of fuel spokes extending into the flow path through the air swirler, and the insulating air cavity being fluidly coupled to the flow path through clearance holes around each fuel spoke of the plurality of fuel spokes.

18. The gas turbine engine of claim 16, wherein the insulating air cavity is fluidly coupled to the compressed air space surrounding the housing only through the plurality of purge holes.

19. The gas turbine engine of claim 18, wherein the plurality of purge holes includes three purge holes.

20. The gas turbine engine of claim 19, wherein at least one of the plurality of purge holes is positioned radially outwardly of the fuel gallery.

* * * * *